United States Patent
Zhang

(10) Patent No.: US 8,905,648 B2
(45) Date of Patent: Dec. 9, 2014

(54) EXPANDED BEAM FIBER OPTIC CONNECTOR

(75) Inventor: Wade F. M. Zhang, Carpentersville, IL (US)

(73) Assignee: Cinch Connectivity Solutions, Inc., Bannockburn, IL (US)

( * ) Notice: Subject to any disclaimer, the term of this patent is extended or adjusted under 35 U.S.C. 154(b) by 0 days.

(21) Appl. No.: 13/135,219

(22) Filed: Jun. 29, 2011

(65) Prior Publication Data

US 2013/0004129 A1 Jan. 3, 2013

(51) Int. Cl.
*G02B 6/38* (2006.01)
*G02B 6/26* (2006.01)

(52) U.S. Cl.
CPC .............. *G02B 6/262* (2013.01); *G02B 6/3853* (2013.01)
USPC ................... 385/60; 385/15; 385/33; 385/34; 385/35; 385/61; 385/72; 385/73; 385/74; 385/78; 385/79

(58) Field of Classification Search
USPC ............ 385/15, 33–35, 60–61, 72–74, 78–79
See application file for complete search history.

(56) References Cited

U.S. PATENT DOCUMENTS

| | | |
|---|---|---|
| 3,910,677 A | 10/1975 | Becker et al. |
| 4,290,667 A | 9/1981 | Chown |
| 4,300,813 A | 11/1981 | Gravel |
| 4,378,954 A | 4/1983 | Baker |
| 4,710,605 A | 12/1987 | Presby |
| 4,753,510 A | 6/1988 | Sezerman |
| 4,781,431 A * | 11/1988 | Wesson et al. .................. 385/79 |
| 4,854,663 A * | 8/1989 | Borsuk et al. .................. 385/77 |
| 4,889,406 A | 12/1989 | Sezerman |
| 4,932,989 A | 6/1990 | Presby |
| 4,964,688 A | 10/1990 | Caldwell et al. |
| 5,011,254 A | 4/1991 | Edwards et al. |
| 5,061,342 A | 10/1991 | Jones |
| 5,097,524 A | 3/1992 | Wasserman et al. |
| 5,247,595 A | 9/1993 | Foldi |
| 5,256,851 A | 10/1993 | Presby |
| 5,400,429 A | 3/1995 | Ames et al. |
| 5,481,634 A | 1/1996 | Anderson et al. |
| 5,501,385 A | 3/1996 | Halpin |
| 5,537,503 A | 7/1996 | Tojo et al. |
| 5,568,581 A | 10/1996 | Johnson et al. |
| 5,598,493 A | 1/1997 | Bonham, Jr. et al. |
| 5,631,986 A | 5/1997 | Frey et al. |
| 5,642,450 A | 6/1997 | Oda |
| 5,778,124 A | 7/1998 | Nedstedt |
| 5,800,666 A | 9/1998 | Bonham, Jr. et al. |
| 5,812,717 A | 9/1998 | Gilliland |
| 5,815,623 A | 9/1998 | Gilliland et al. |
| 5,909,528 A | 6/1999 | Tamekuni et al. |
| 5,940,557 A | 8/1999 | Harker |
| 6,035,664 A | 3/2000 | Hashizume |
| 6,120,191 A | 9/2000 | Asakura et al. |
| 6,123,465 A | 9/2000 | Hashizume |
| 6,139,196 A | 10/2000 | Feth et al. |

(Continued)

*Primary Examiner* — Ryan Lepisto
*Assistant Examiner* — Guy Anderson
(74) *Attorney, Agent, or Firm* — Karl D. Kovach

(57) ABSTRACT

The expanded beam, fiber optic connector includes an optical fiber, and a ferrule. The optical fiber includes a modified mode field diameter segment. The ferrule includes a recess. The optical fiber is retained by the ferrule. The modified mode field diameter segment is positioned in the recess of the ferrule.

5 Claims, 10 Drawing Sheets

(56) References Cited

U.S. PATENT DOCUMENTS

| | | |
|---|---|---|
| 6,234,683 B1 | 5/2001 | Waldron et al. |
| 6,246,026 B1 | 6/2001 | Vergeest |
| 6,263,133 B1 | 7/2001 | Hamm |
| 6,282,348 B1 * | 8/2001 | Carlisle et al. .................. 385/78 |
| 6,283,644 B1 | 9/2001 | Gilliland et al. |
| 6,367,984 B1 * | 4/2002 | Stephenson et al. ............ 385/53 |
| 6,419,405 B1 | 7/2002 | Boscha |
| 6,550,983 B1 | 4/2003 | Gilliland et al. |
| 6,599,029 B2 | 7/2003 | Yamazaki et al. |
| 6,632,025 B2 * | 10/2003 | Ukrainczyk ..................... 385/70 |
| 6,655,850 B2 * | 12/2003 | Mann et al. ...................... 385/74 |
| 6,671,432 B2 * | 12/2003 | Imada et al. ..................... 385/33 |
| 6,736,547 B2 | 5/2004 | Stevens et al. |
| 6,805,491 B2 | 10/2004 | Durrant et al. |
| 6,939,055 B2 | 9/2005 | Durrant et al. |
| 6,952,508 B2 | 10/2005 | Simons et al. |
| 6,953,288 B2 * | 10/2005 | Foley et al. ...................... 385/92 |
| 6,955,478 B2 | 10/2005 | Durrant et al. |
| 7,031,567 B2 | 4/2006 | Grinderslev et al. |
| 7,048,449 B2 | 5/2006 | Frojdh et al. |
| 7,155,096 B2 | 12/2006 | Chanclou et al. |
| 7,228,033 B2 | 6/2007 | Bhagavatula et al. |
| 7,242,835 B2 * | 7/2007 | Busse et al. .................... 385/125 |
| 7,460,750 B2 | 12/2008 | Durrant et al. |
| 2004/0156585 A1 * | 8/2004 | Matusick et al. ............... 385/33 |
| 2008/0050073 A1 * | 2/2008 | Kadar-Kallen et al. ......... 385/79 |

* cited by examiner

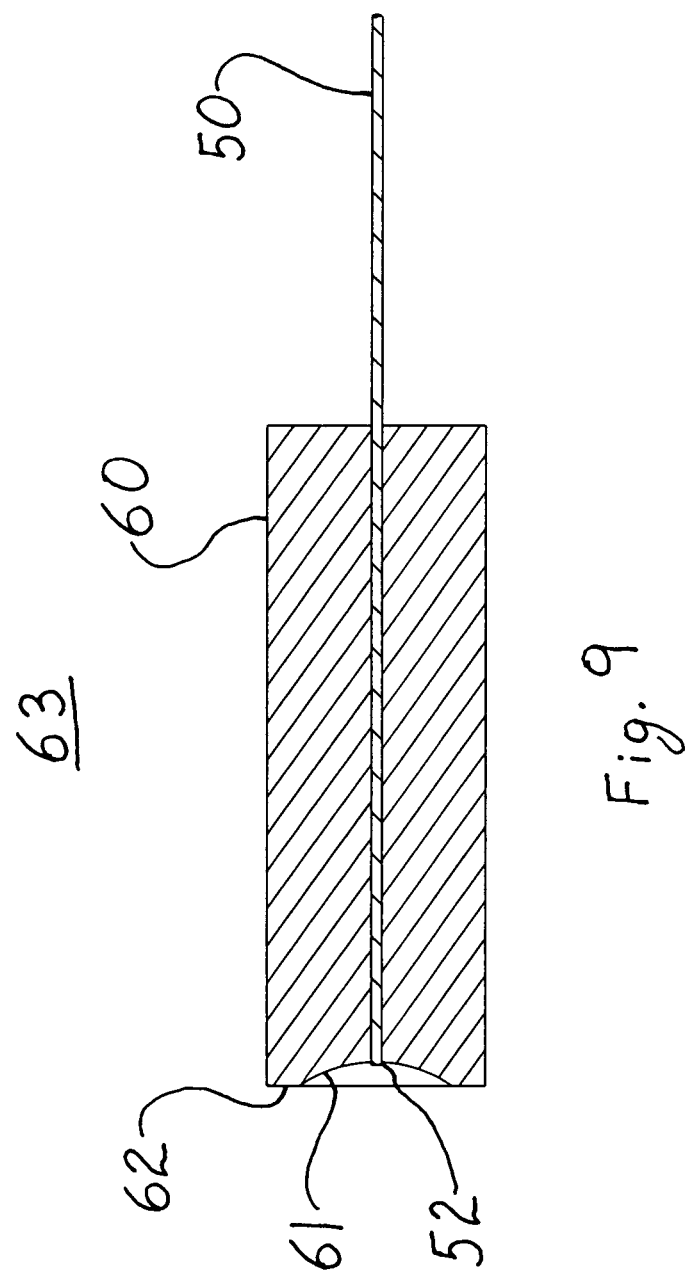

EXPANDED BEAM FIBER OPTIC CONNECTOR

BACKGROUND OF THE INVENTION

1. Field of the Invention

The present invention pertains to fiber optic connectors. The invention more particularly concerns a fiber optic connector which enables a user to replace a physical contact, fiber optic connector with an expanded beam, fiber optic connector.

2. Discussion of the Background

Fiber optic connectors and cables are known in the art. Typically, a fiber optic cable is terminated at each end by a respective fiber optic connector. At least two categories of fiber optic connectors exist and include physical contact connectors and expanded beam connectors. In practice, a fiber optic cable terminated with physical contact connectors will only connect to other fiber optic cables which are also terminated with physical contact connectors. Likewise, in practice, a fiber optic cable terminated with expanded beam connectors will only connect to other fiber optic cables which are also terminated with expanded beam connectors.

Physical contact connectors are characterized as such since one end of a ferrule of a first fiber optic connector physically contacts one end of a ferrule of a second fiber optic connector. Light exiting the core of the optical fiber held within the ferrule of the first fiber optic connector is then immediately introduced into the core of the optical fiber held within the ferrule of the second fiber optic connector. If the two cores are misaligned by more than a whole number of diameters of the core of the optical fiber, then most of the optical power is not exchanged from the core of the first fiber optic connector to the core of the second fiber optic connector. If a piece of debris is caught between the core of the first fiber optic connector and the core of the second fiber optic connector, then it is probable that no optical power will be exchanged from the core of the first fiber optic connector to the core of the second fiber optic connector, assuming that the debris has a size which is approximately the same size or larger than the size of the core of one of the optical fibers. Examples of physical contact connectors are set forth in U.S. Pat. Nos. 5,481,634, and 6,234,683. U.S. Pat. Nos. 5,481,634, and 6,234,683 are hereby incorporated herein by reference. Over time, the industry has utilized many physical contact, single fiber, fiber optic connectors as standards or styles, such as the LC, FC, ST, and SC fiber optic connectors.

FIG. 1 is a perspective view of one type of physical contact, single fiber, fiber optic connector 10. The fiber optic connector 10 includes a ferrule 12. Also shown is an optical cable 16. The fiber optic connector 10 generally conforms to the LC-style fiber optic connector. The ferrule 12 conforming to the LC-style has an outside diameter of approximately 1.25 millimeters. FIG. 2 is an exploded, perspective view of the fiber optic connector 10 of FIG. 1. Further shown in FIG. 2 is the optical fiber 14 of the optical cable 16. Also, the ferrule 12 is more clearly shown. FIG. 3 is a partial cross-sectional side view of two fiber optic connectors 10, 20, and two receptacles 18, 19. Fiber optic connector 10 is shown in partial cross-section, but the ferrule 12 is shown in side view. The other fiber optic connector 20 and the two receptacles 18, 19 are shown in cross-section. Receptacle 18 is attached to receptacle 19. Each receptacle 18, 19 is adapted to receive a fiber optic connector that conforms to the LC-style. Also shown is the physical contact between the ferrule 12 of the one fiber optic connector and the ferrule 22 of the other fiber optic connector 20.

FIG. 4 is a perspective view of three different types or styles of physical contact, single fiber, fiber optic connectors. A flat panel 24 contains three openings. The first opening is a receptacle 26 which accommodates two SC-type fiber optic connectors 32, 33, the second opening is a receptacle 28 which accommodates two FC-style fiber optic connectors 34, 35, and the third opening is a receptacle 30 which accommodates two ST-style fiber optic connectors 36, 37. The ferrules of the fiber optic connectors 32, 33, 34, 35, 36, 37 have an outside diameter of approximately 2.5 millimeters. FIGS. 1, 2, 3, and 4 are illustrations derived from figures found in U.S. Pat. No. 5,481,634.

Expanded beam connectors are characterized as such since the optical fiber of the fiber optic cable is mated with a lens, typically a ball lens. The expanded beam fiber optic connector holds the terminated end of the optical fiber adjacent to the lens. When optical power exits the core of the optical fiber, the optical power then enters the lens, and then eventually exits the lens. The lens causes the optical power, or light, to diverge or expand before the optical power exits the fiber optic connector. If a second expanded beam fiber optic connector is attached to the first expanded beam fiber optic connector, then, after the optical power exits the first expanded beam fiber optic connector in the expanded state, the optical power will enter the second expanded beam fiber optic connector. The optical power will enter the lens of the second expanded beam fiber optic connector and then exit the lens. The lens of the second expanded beam fiber optic connector causes the optical power to converge. The focal point of the lens of the second expanded beam fiber optic connector is centered at the core of the optical fiber of the second fiber optic cable so that substantially all of the optical power exiting the lens enters the optical fiber. If the two cores are misaligned by less than a whole number of diameters of the core of the optical fiber, then most of the optical power is exchanged from the core of the first fiber optic connector to the core of the second fiber optic connector. If a piece of debris is caught between the lens of the first fiber optic connector and the lens of the second fiber optic connector, then it is probable that some of the optical power will be exchanged from the core of the first fiber optic connector to the core of the second fiber optic connector, assuming that the debris has a size which is approximately the same size or larger than the size of the core of one of the optical fibers but is smaller than the diameter of the expanded beam. Examples of expanded beam connectors are set forth in U.S. Pat. No. 5,247,595. U.S. Pat. No. 5,247,595 is hereby incorporated herein by reference.

FIG. 5 is a cross-sectional side view of an expanded beam connector 40 that includes an optical fiber 41 and a lens 42. FIG. 6 is a cross-section side view of two expanded beam connectors 40, 43 which are readied for optical communication with one another. FIGS. 5, and 6 are illustrations derived from figures found in U.S. Pat. No. 5,247,595.

Another type of expanded beam device exists. FIG. 7A is a side view of an optical fiber 50 which includes a collimator portion. The collimator portion includes a mode widening segment 52 so as to expand the light transmitted through the optical fiber as the light travels from a single mode fiber portion 51 and into and through the mode widening segment 52 and an expansion holding segment 53 which keeps the expanded light in an expanded state. However, the collimator portion may include only the mode widening segment 52. FIG. 7A is an illustration derived from figures in U.S. Pat. No. 7,155,096. U.S. Pat. No. 7,155,096 is hereby incorporated herein by reference. The segment 52 of the optical fiber which expands the transmitted light is also known as a modified mode field diameter (MFD) which expands the beam size.

The MFD segment 52 may be fused or welded onto an optical fiber 50 or an optical fiber 50 can be doped so as to form a MFD segment 52. As compared to the spherical ball lens in FIG. 5, the MFD segment 52 of the optical fiber 50 is approximately the same diameter as the diameter of the single mode portion 51 of the optical fiber 50.

Note that the tip of the optical fiber 50 can have various shapes. FIG. 7B is a cross-sectional side view of an optical fiber 50 where the MFD segment 52 includes a diameter widening portion which acts as a magnifier. Also, as another example, FIG. 7C is a cross-sectional side view of the optical fiber 50 where the MFD segment 52 includes a generally spherically shaped portion.

Accordingly, there is a need for a device which incorporates the advantages of the expanded beam fiber optic connector into the well received package size of the known physical contact, fiber optic connectors.

SUMMARY OF THE INVENTION

It is an object of the invention to provide a device that includes expanded beam technology and which is mountable to an industrial standard or existing receptacle or adapter where the receptacle or adapter was originally designed to accommodate a physical contact, fiber optic connector.

It is another object of the invention to provide a device that includes expanded beam technology and is mountable or intermateable with a receptacle where the receptacle was originally designed to accommodate a LC-style fiber optic connector.

It is another object of the invention to provide a device that includes expanded beam technology and is mountable or intermateable with a receptacle where the receptacle was originally designed to accommodate a SC-style fiber optic connector.

It is another object of the invention to provide a device that includes expanded beam technology and is mountable or intermateable with a receptacle where the receptacle was originally designed to accommodate a FC-style fiber optic connector.

It is another object of the invention to provide a device that includes expanded beam technology and is mountable or intermateable with a receptacle where the receptacle was originally designed to accommodate a ST-style fiber optic connector.

In one form of the invention the device includes an optical fiber and a ferrule. The optical fiber includes a modified field diameter (MFD) segment so as to expand the transmitted light. The ferrule includes a recess. The ferrule retains the optical fiber. The MFD segment of the optical fiber is in or adjacent to the recess of the ferrule. The ferrule has an outside diameter that is substantially the same as the outside diameter of a ferrule of a physical contact, fiber optic connector, such as one of an LC, SC, FC, and ST style or standard fiber optic connectors.

In a second form of the invention the device includes an optical fiber and a ferrule. The optical fiber includes a modified field diameter (MFD) segment so as to expand the transmitted light. The ferrule includes a recess. The ferrule retains the optical fiber. The MFD segment of the optical fiber is in or adjacent to the recess of the ferrule. The ferrule has an outside diameter that is substantially equal to 1.25 millimeters.

In a third form of the invention the device includes an optical fiber and a ferrule. The optical fiber includes a modified field diameter (MFD) segment so as to expand the transmitted light. The ferrule includes a recess. The ferrule retains the optical fiber. The MFD segment of the optical fiber is in or adjacent to the recess of the ferrule. The ferrule has an outside diameter that is substantially equal to 2.5 millimeters.

Thus, the invention achieves the objectives set forth above. The invention provides a device which includes expanded beam technology, yet is mateable with or connectable to receptacles or adapters where the receptacles or adapter were designed to accommodate physical contact, single fiber, fiber optic connectors such as LC, SC, FC, and ST style fiber optic connectors. Also, the expanded beam connectors of the invention provide a greater resistance to contamination than the physical contact fiber optic connectors, and the device is relatively compact.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a cross-sectional side of the expanded beam, fiber optic connector of FIG. 8 taken along section line 9-9 of FIG. 8;

DETAILED DESCRIPTION OF THE PRESENTLY PREFERRED EMBODIMENTS

Figure 1:
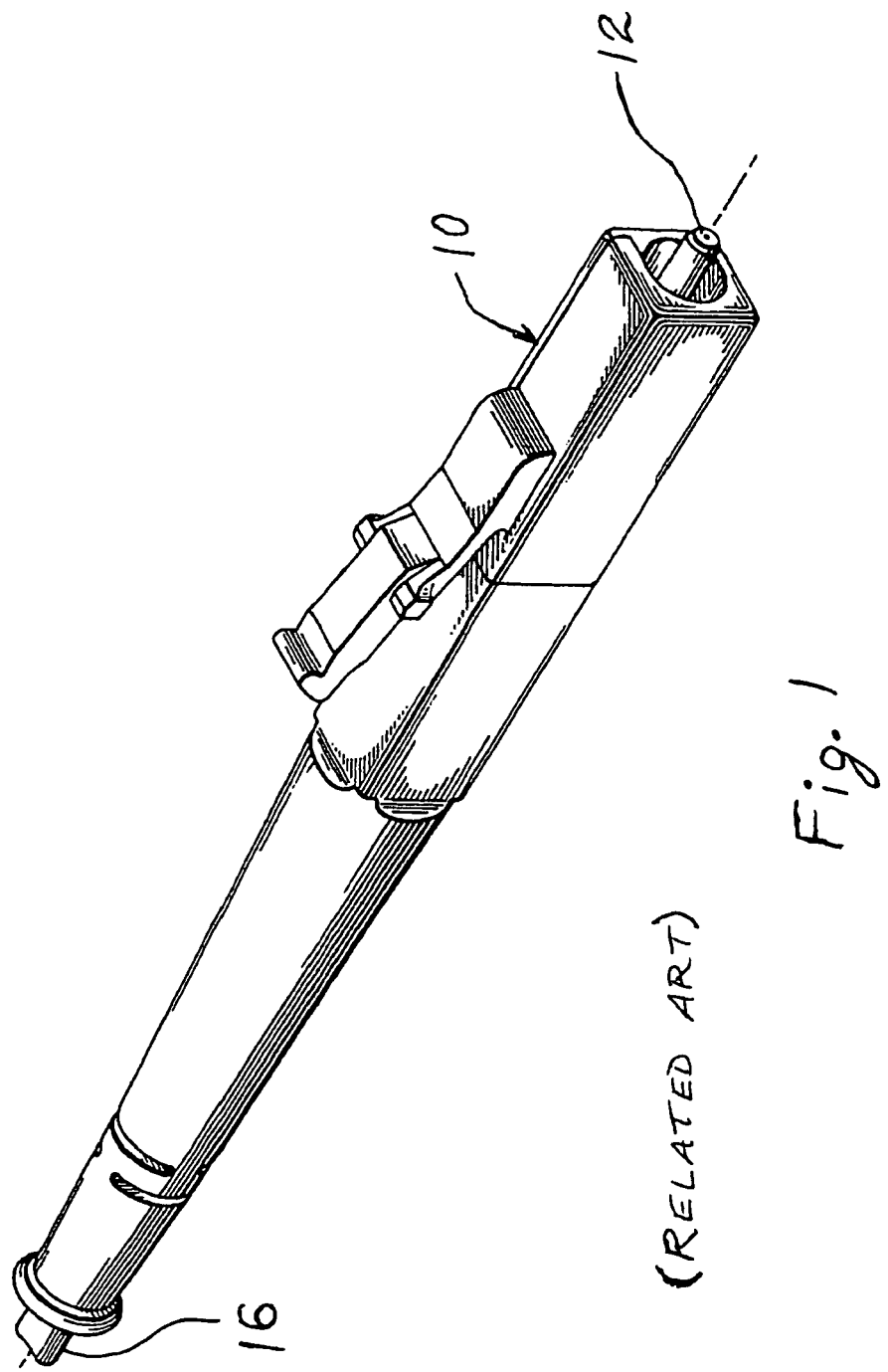
FIG. 1 is a perspective view of one type of a known physical contact, fiber optic connector.

Referring now to the drawings, wherein like reference numerals designate identical or corresponding parts throughout the several views, and more particularly to FIGS. 8-12 thereof, an embodiment of the present invention is a device or expanded beam, fiber optic connector 63 which is displayed therein.

Figure 8:
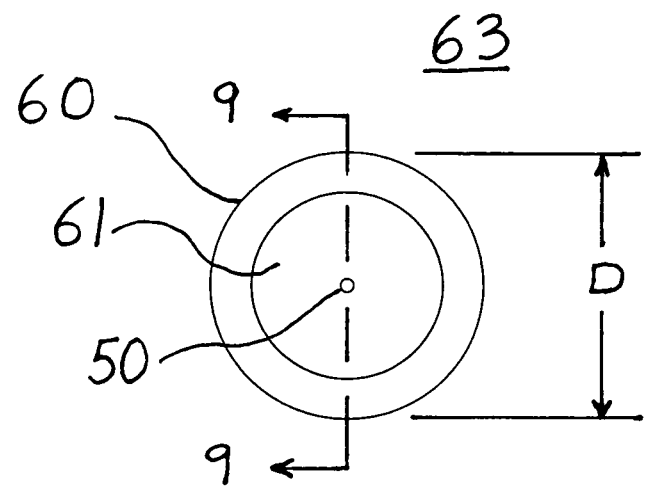
FIG. 8 is an end view of the expanded beam, fiber optic connector of the invention.

FIG. 8 is an end view of the device or expanded beam, fiber optic connector 63. The device 63 includes a ferrule 60, and an optical fiber 50. The ferrule 60 includes a recess 61. The ferrule 60 further includes an outside diameter identified by alphabetic character D. The outside diameter D of the ferrule 60 can be of any size, but for the ferrule 60 to conform to the standard of an LC connector the ferrule has an outside diameter D which is substantially equal to 1.25 millimeters, and if the ferrule 60 is to conform to the SC, ST, and FC standards then the outside diameter D of the ferrule 60 is substantially equal to 2.5 millimeters.

Figure 10:
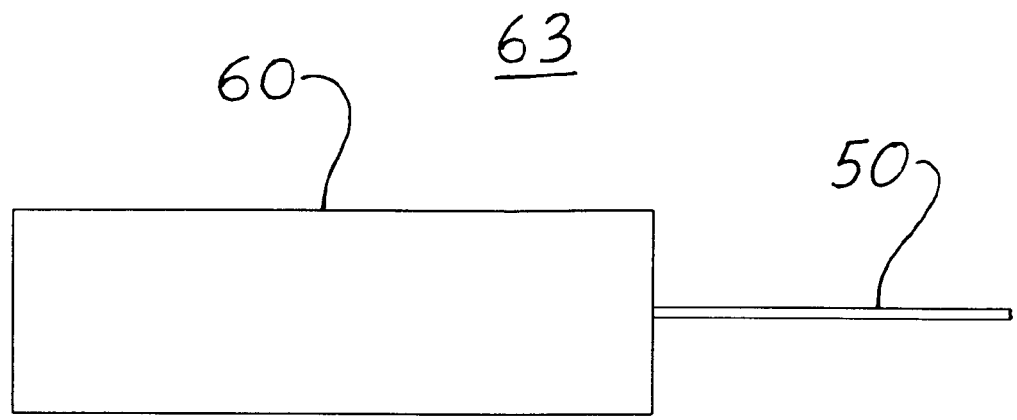
FIG. 10 is side view of the expanded beam, fiber optic connector of FIG. 8.

FIG. 9 is a cross-sectional side view of the device 63 taken along section line 9-9 of FIG. 8. Further shown in FIG. 9 are the recess 61 of the ferrule 60, a mating edge 62 of the ferrule 60, and the modified mode field diameter segment 52 of the optical fiber 50. FIG. 10 is a side view of the device 63.

Figure 11:
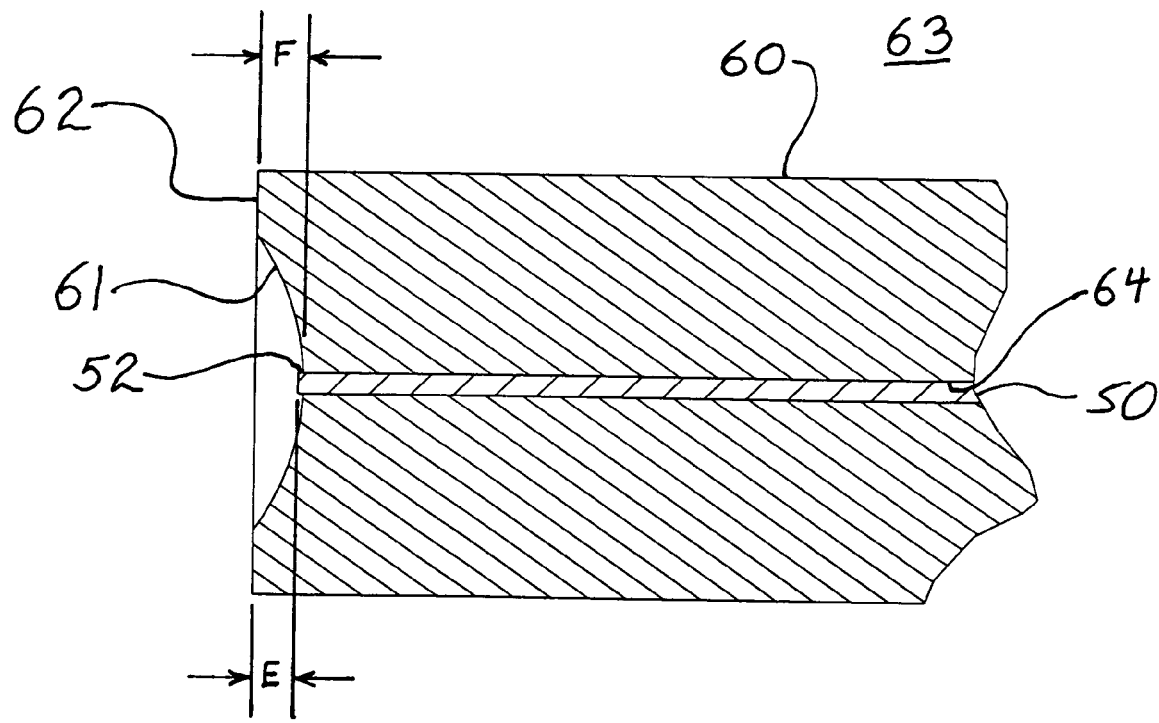
FIG. 11 is an exploded, cross-sectional side view of the expanded beam, fiber optic connector of FIG. 9.

FIG. 11 is an exploded, cross-sectional side view of the device 63 of FIG. 9. The end of the optical fiber 50 as measured from the modified mode field diameter segment 52 of the optical fiber 50 to the mating edge 62 of the ferrule 60 is identified by alphabetic character E. The distance E is a positive value so that the end of the optical fiber 50 is in the recess 61 and does not extend out of the recess 61 and past the mating edge 62. The furthest most distance between the recess 61 and the mating edge 62 of the ferrule is identified by alphabetic character F. The distance F can be equal to or slightly greater than the distance E. The optical fiber 50 can be either a single mode optical fiber or a multi-mode optical fiber. The recess 61 can be as shown which is a concave shape which, generally, has the shape of a partially removed sphere having a constant spherical radius. However, the recess 61 can be of any shape which provides for a positive distance for dimensions F and E and where distance F is greater than distance E. As an example, other recess shapes can include a cylindrical bore and a conical bore.

Figure 7A:
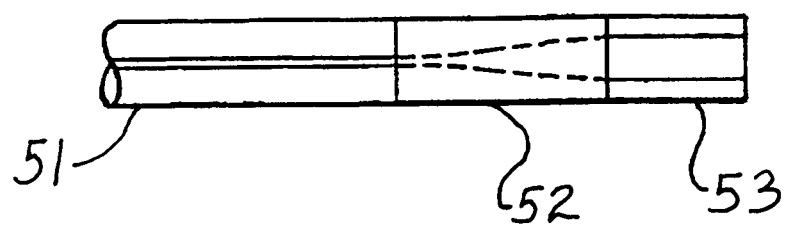
FIG. 7A is a side view of a known optical fiber having a collimator portion.
Figure 7B:
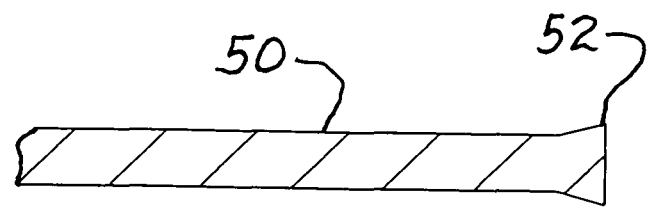
FIG. 7B is a side view of a known optical fiber having an enlarged diameter portion.
Figure 7C:
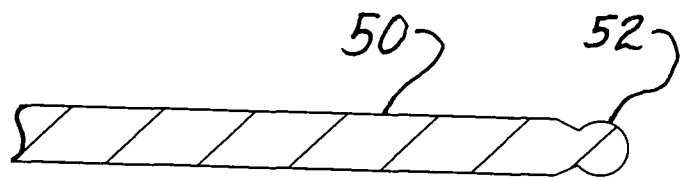
FIG. 7C is a side view of a known optical fiber having a spherical portion.

The optical fiber 50 of FIG. 11 can be the same as or similar to the optical fiber 50 disclosed in FIGS. 7A, 7B, and 7C, or the tip of the optical fiber 50 can have some other shape. Additionally, the optical fiber 50 can be a single-mode fiber or a multi-mode fiber.

During assembly of the device 63, the optical fiber 50 is introduced into an aperture 64 of the ferrule 60. The optical fiber 50 is retained in the ferrule 60 by crimping the ferrule 60 onto the optical fiber 50, provided the ferrule 60 is made of a metallic material. If the ferrule 60 is made of a ceramic material or a polymer material, then the optical fiber 50 is retained by the ferrule 60 by way of a suitable adhesive which are well known in the art. As can be seen from FIGS. 9 and 11, the aperture 64 of the ferrule 60 forms a longitudinal axis around which the ferrule 60 is symmetric, including the constant spherical radius of the concave shape of the recess 61 of the ferrule 60 being symmetric about the longitudinal axis of the aperture 64 of the ferrule 60. As seen in FIGS. 9, 10, 11, and 12, the ferrule 60 is constructed from a one-piece body of material.

Figure 3:
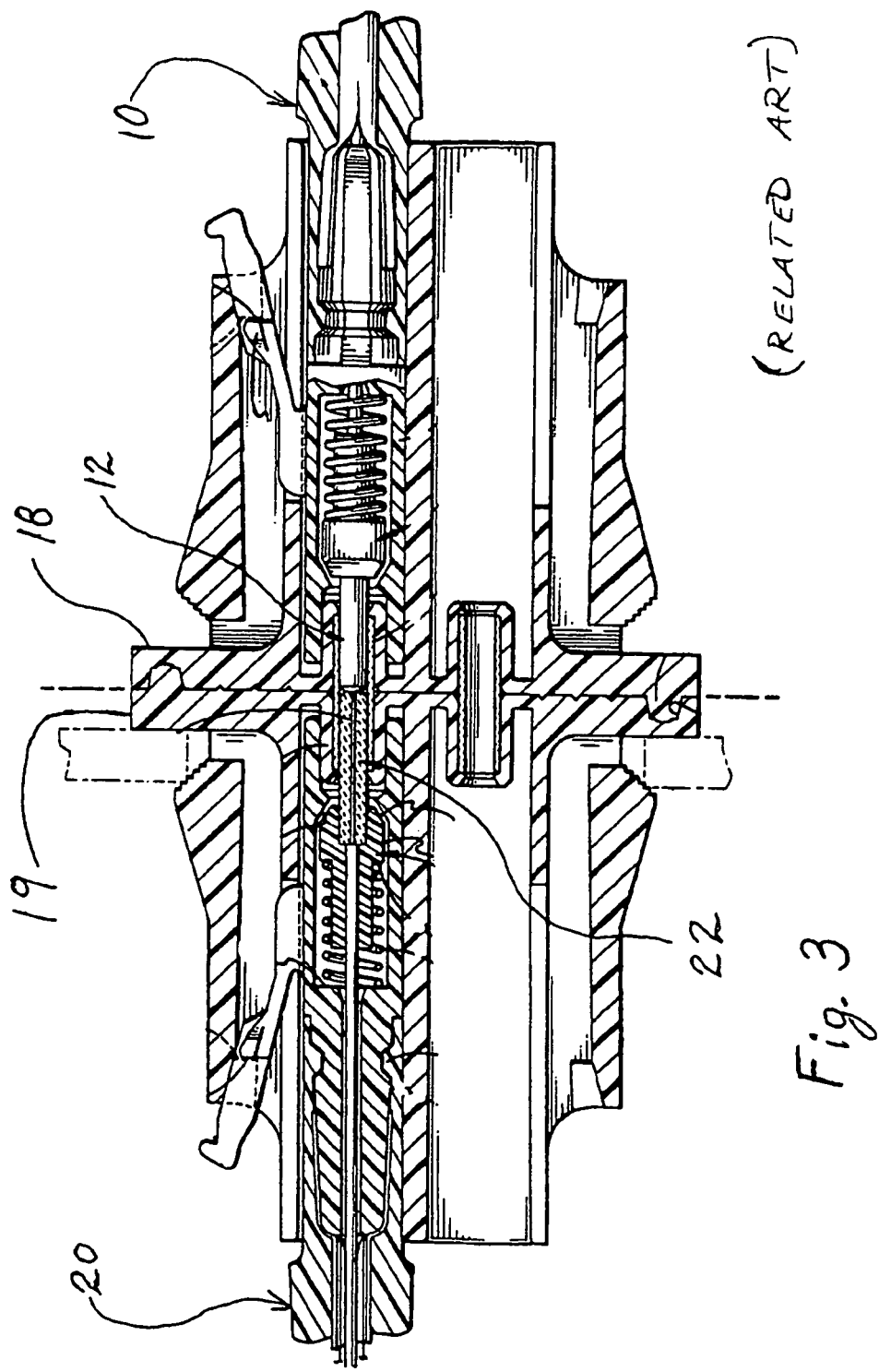
FIG. 3 is a partial cross-sectional side view of a known assembly which includes the known physical contact, fiber optic connector of FIG. 1 and another physical contact, fiber optic connector and two receptacles, where each of the physical contact, fiber optic connects are positioned so as to enable optical communication between each of the two physical contact, fiber optic connectors.
Figure 12:
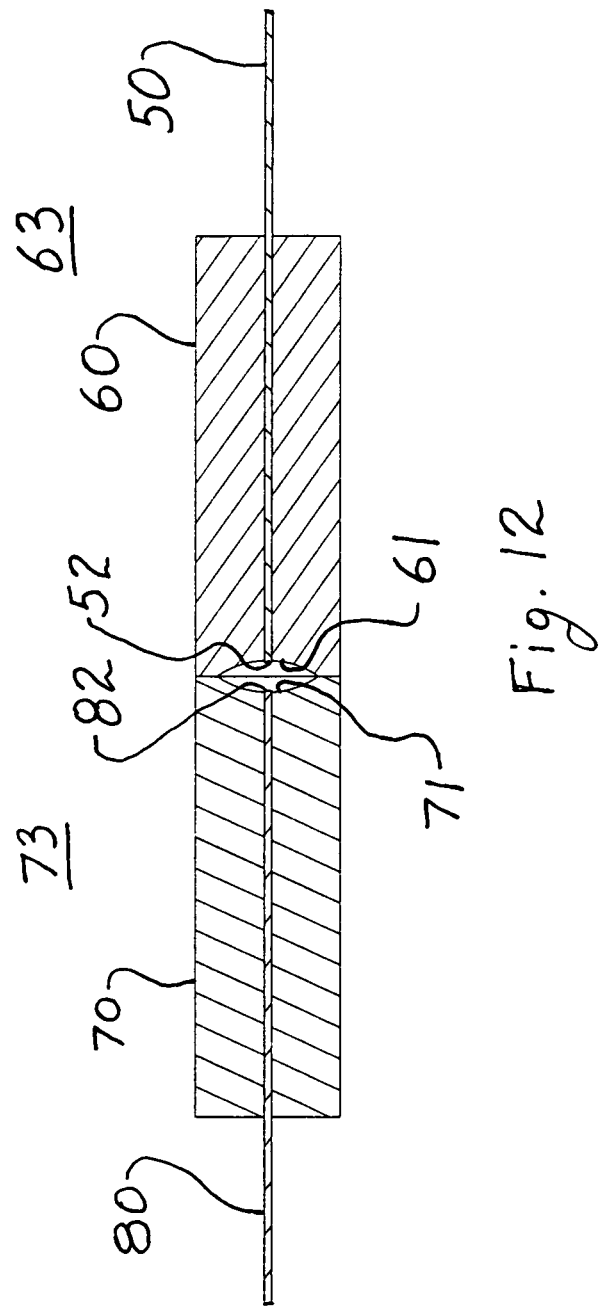
FIG. 12 is a cross-sectional side view of the expanded beam, fiber optic connector of FIG. 9 which is mated to an identical connector.

FIG. 12 is a cross-sectional side view of the device 63 mating, in physical contact, with another device 73, including ferrule 70 and optical fiber 80, which is substantially identical to the device 63. The engagement of ferrules 60, 70 is similar to the engagement of ferrules 12, 22 as shown in FIG. 3. In FIG. 12, light is transmitted along optical fiber 50 and is expanded as it leaves the modified mode field diameter segment 52. The light then traverses the recess 61 and then recess 71, and then the light signal enters optical fiber 80 at its modified mode field diameter segment 82. As the light traverses the modified mode field diameter segment 82, the light is focused on a focal point located substantially at the core of the optical fiber 80 for further transmission down optical fiber 80. Light can also be transmitted in the reverse direction. The light signal which is transmitted between modified mode field diameter segments 52, 82 is transmitted in an expanded beam mode.

As shown in FIG. 12, the distance between the tips or modified mode field diameter segments 52, 82 of optical fibers 50, 80 helps to reduce the probability that a foreign object will be trapped between the tips of the optical fibers 50, 80 which could hamper the transmission of light between the optical fibers 50, 80. The recess 61, or the distance from the mating edge 62 to the tip 52 of the optical fiber 50 otherwise denoted by distance E, also provides some degree of protection for the tip 52 of the optical fiber 50 from being directly contacted by objects since the tip 52 is shielded. Furthermore, since the light signal that is transmitted between the modified mode field diameter segments 52, 82 is transmitted in the expended beam mode, the mated device 63, 73 can accommodate some amount of contamination or particulate matter or other debris between the modified mode field diameter segments 52, 82 and still successfully transmit the light signal without too much power loss. Additionally, since the light signal is transmitted in the expanded beam mode between the modified mode field diameter segments 52, 82 some amount of transverse misalignment between devices 63, 73 is acceptable. In short, the tip or modified mode field diameter segment 52 is not in physical contact with the other connector, only the mating edge 62 is in physical contact with the other connector. However, the device 63 can be used where physical contact connectors are typically employed.

Figure 2:
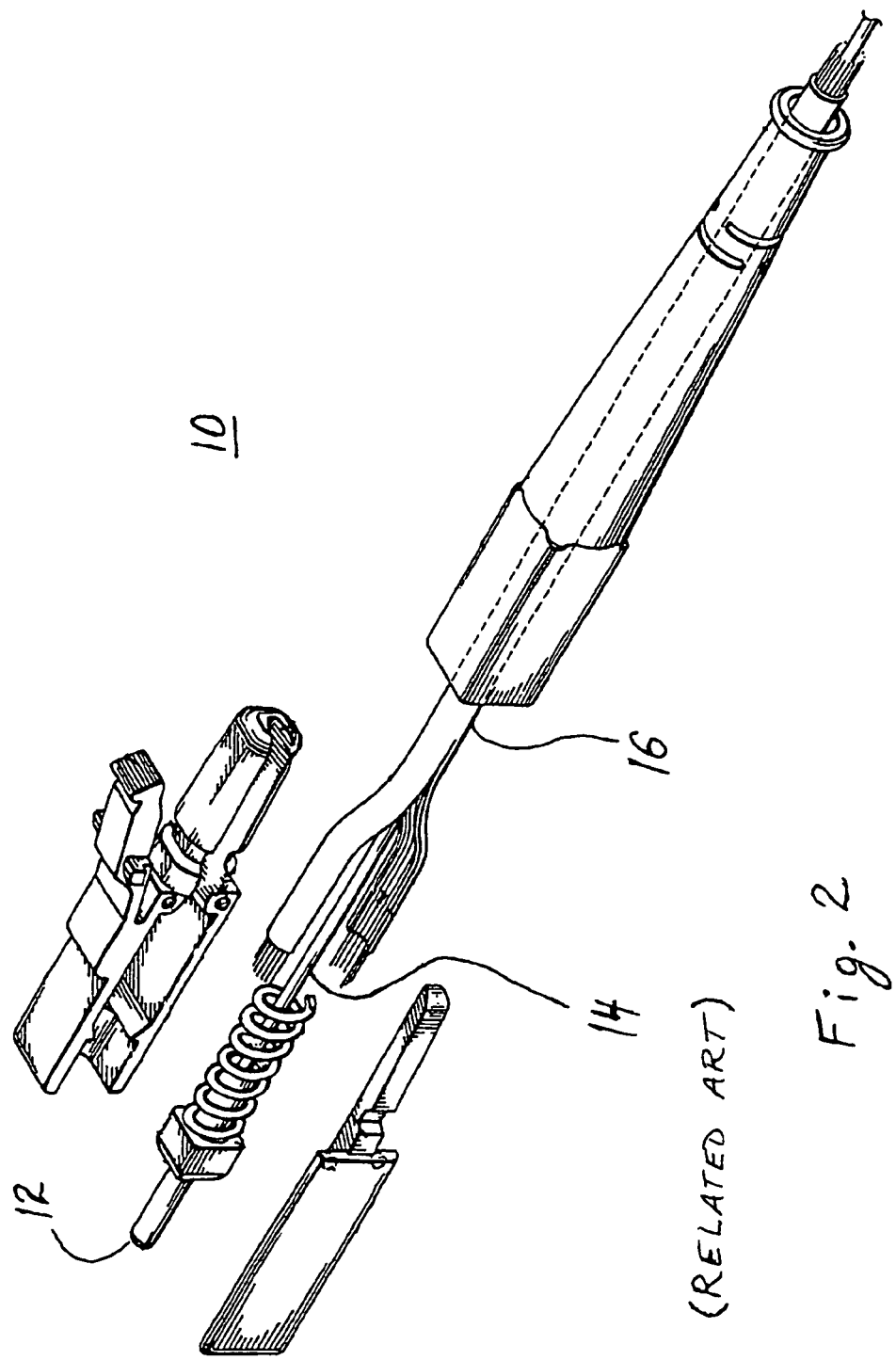
FIG. 2 is an exploded, perspective view of the known fiber optic connector of FIG. 1.
Figure 4:
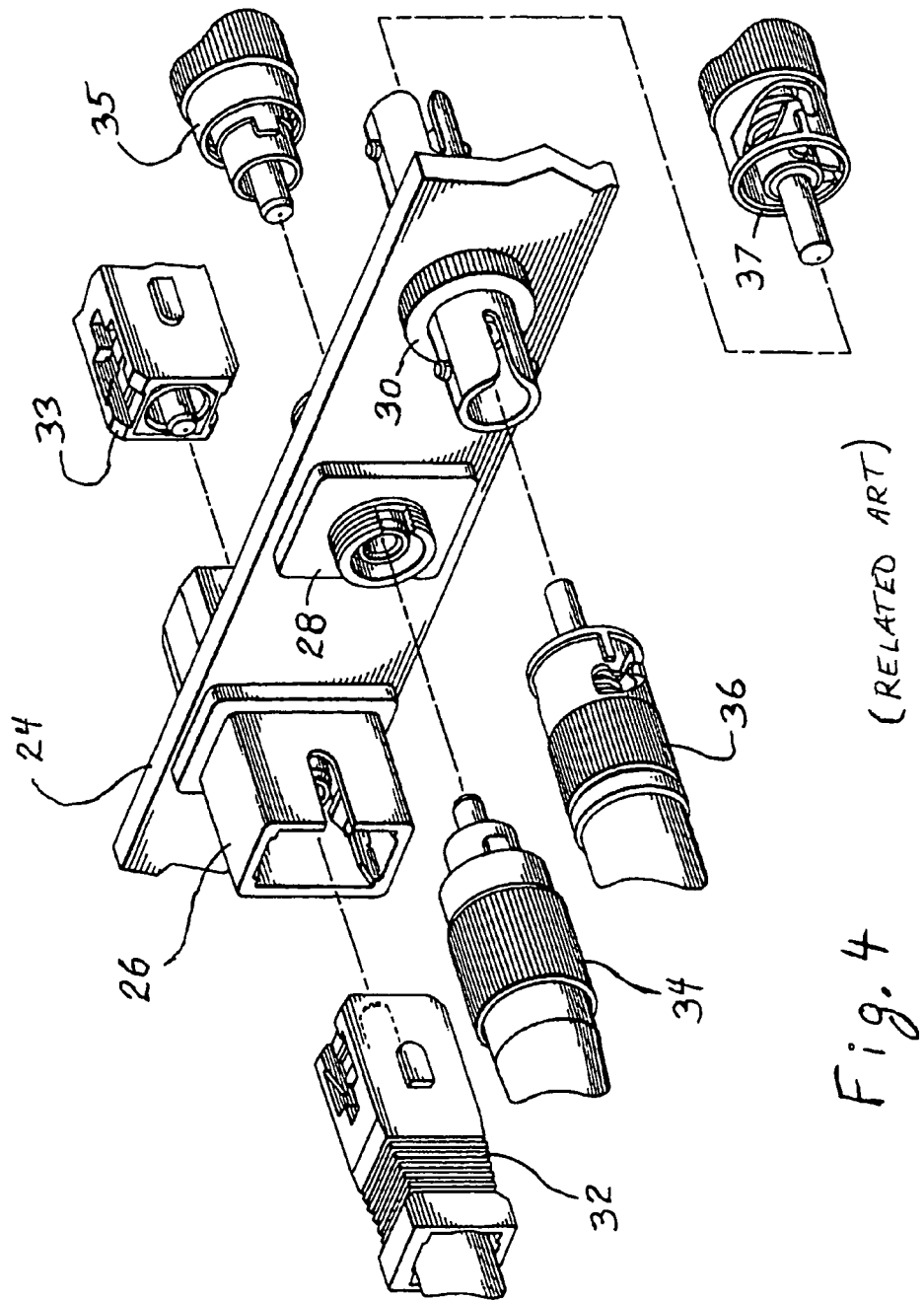
FIG. 4 is a perspective view of three different types or styles of known physical contact, fiber optic connectors.
Figure 5:
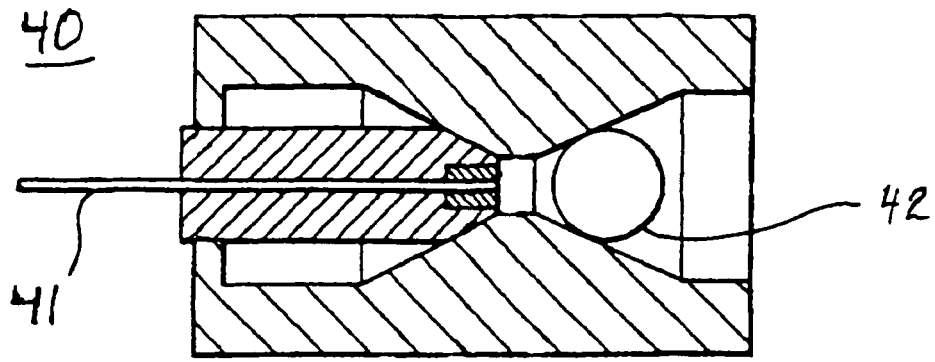
FIG. 5 is a cross-sectional side view of a known expanded beam, fiber optic connector.
Figure 6:
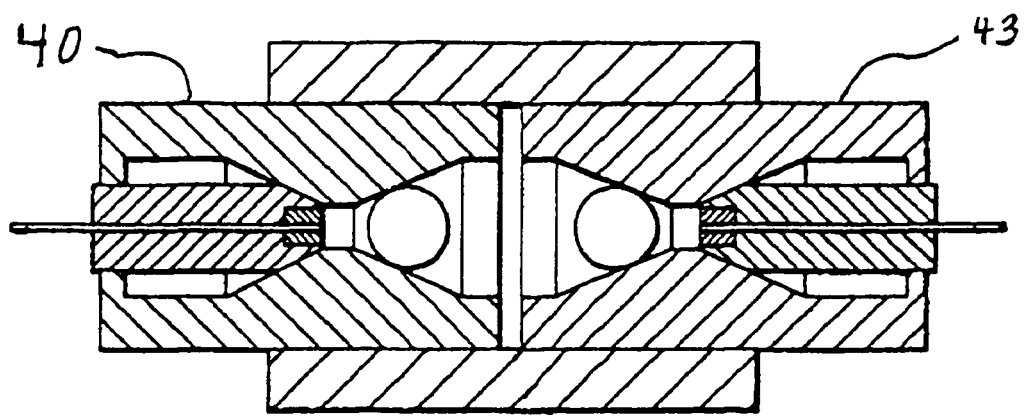
FIG. 6 is a cross-sectional side view of a known assembly which includes the known expanded beam, fiber optic connector of FIG. 5 and another expanded beam, fiber optic connector where each of the expanded beam, fiber optic connectors are positioned so as to enable optical communication between each of the two expanded beam, fiber optic connectors.

The ferrule 60 can be used as a physical contact connector and can be inserted into the adapters shown in FIGS. 3 and 4. Also connector bodies can be attached to the ferrule 60 so as to construct a latching connector as shown in FIGS. 1, 2, and 3, or the ferrule 60 can be associated with bayonet bodies so as to construct bayonet mounting connectors such as are associated with receptacles 28, 30 of FIG. 4. Note that the drawings may not be drawn to scale.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
an optical fiber having a modified mode field diameter segment; and
a ferrule having a recess, an outside diameter substantially equal to 1.25 millimeters, an aperture in which the optical fiber is retained, and a mating edge so as to enable physical contact mating with connectors, and wherein the modified mode field diameter segment of the optical fiber is positioned in the recess of the ferrule, and wherein the mating edge is separated from a location where the optical fiber enters the recess of the ferrule by a first distance, and wherein the mating edge is separated from the modified mode field diameter segment by a second distance, and wherein the first distance is greater than the second distance, and wherein the recess of the ferrule has a concave shape having a constant spherical radius, and wherein the radius of the recess is greater than an outside diameter of the optical fiber, and wherein the ferrule having a one-piece body, and wherein the aperture of the ferrule forms a longitudinal axis, and wherein the constant spherical radius of the concave shape of the recess of the ferrule is symmetric about the longitudinal axis of the aperture of the ferrule.

2. A device according to claim 1 wherein the ferrule is made of a metallic material.

3. A device according to claim 1 wherein the ferrule is made of a ceramic material.

4. A device according to claim 3, further comprising an adhesive material so as to bond the optical fiber to the ferrule.

5. A device comprising:
  an optical fiber having a modified mode field diameter segment; and
  a ferrule having a recess, an outside diameter substantially equal to 2.5 millimeters, an aperture in which the optical fiber is retained, and a mating edge so as to enable physical contact mating with connectors, and wherein the modified mode field diameter segment of the optical fiber is positioned in the recess of the ferrule, and wherein the mating edge is separated from a location where the optical fiber enters the recess of the ferrule by a first distance, and wherein the mating edge is separated from the modified mode field diameter segment by a second distance, and wherein the first distance is greater than the second distance, and wherein the recess of the ferrule has a concave shape having a constant spherical radius, and wherein the radius of the recess is greater than an outside diameter of the optical fiber, and wherein the ferrule having a one-piece body, and wherein the aperture of the ferrule forms a longitudinal axis, and wherein the constant spherical radius of the concave shape of the recess of the ferrule is symmetric about the longitudinal axis of the aperture of the ferrule.

* * * * *